United States Patent [19]

Shu

[11] Patent Number: 5,273,666
[45] Date of Patent: Dec. 28, 1993

[54] CONSOLIDATION AGENT AND METHOD

[75] Inventor: Paul Shu, Cranbury, N.J.

[73] Assignee: Mobil Oil Corporation, Fairfax, Va.

[21] Appl. No.: 810,637

[22] Filed: Dec. 19, 1991

[51] Int. Cl.$^5$ .......................................... E21B 33/138
[52] U.S. Cl. .................................. 252/8.551; 166/294
[58] Field of Search ...................... 252/8.551; 166/294

[56] References Cited

U.S. PATENT DOCUMENTS

| | | | |
|---|---|---|---|
| 2,259,875 | 10/1941 | Bent et al. | 166/294 X |
| 2,281,810 | 5/1942 | Stone et al. | 166/294 X |
| 3,660,984 | 5/1972 | Anderson | 61/36 R |
| 3,918,521 | 11/1975 | Snavely, Jr. et al. | 166/272 |
| 4,417,623 | 11/1983 | Anthony | 166/294 |
| 4,440,227 | 4/1984 | Holmes | 166/261 |
| 4,479,894 | 10/1984 | Chen et al. | 252/8.55 |
| 4,489,783 | 12/1984 | Shu | 166/272 |
| 4,513,821 | 4/1985 | Shu | 166/273 |
| 4,549,608 | 10/1985 | Stowe et al. | 166/280 |
| 4,669,542 | 6/1987 | Venkatesan | 166/258 |

Primary Examiner—Gary Geist
Attorney, Agent, or Firm—A. J. McKillop; G. W. Hager, Jr.; C. A. Malone

[57] ABSTRACT

A sand consolidation method to provide for use in a borehole having an unconsolidated or loosely consolidated oil or gas reservoir which is likely to introduce substantial amounts of sand into the borehole and cause caving. After perforating the borehole's casing at an interval of the formation where sand will be produced, an aqueous slug of hydroxide is injected into said interval. Next, a spacer volume of a water-immiscible hydrocarbonaceous liquid slug is injected into the interval. Thereafter, a water-miscible solvent slug of an alkylpolysilicate is injected into the interval. A permeability retaining silica cement is formed in the interval. Injection of aqueous hydroxide and alkylpolysilicate slugs is continued until the interval has been consolidated by the silica cement to an extent sufficient to prevent sand migration and thereby prevent caving.

21 Claims, 1 Drawing Sheet

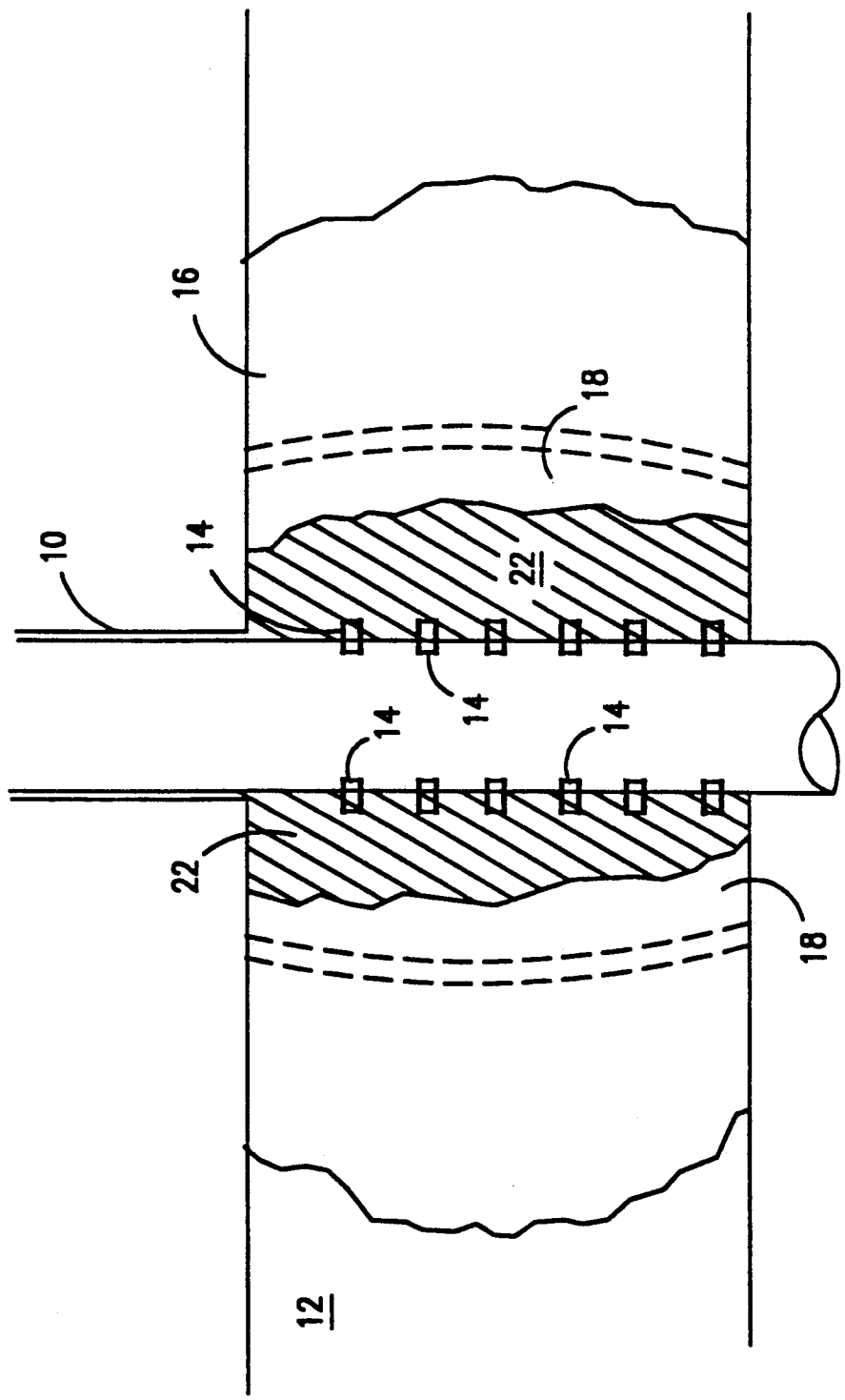

5,273,666

CONSOLIDATION AGENT AND METHOD

FIELD OF THE INVENTION

This invention relates to the consolidation of subterranean formations and, more particularly, to a method of introducing two consolidating fluids into a zone of an incompetent formation so as to form a silica cement adjacent to a well penetrating the formation. The method of this invention is especially useful in promoting more uniform fluid injection patterns in a consolidated interval of the formation so as to tolerate low pH steam when conducting a steam-flooding or fire-flooding enhanced oil recovery operation.

BACKGROUND OF THE INVENTION

It is well known in the art that wells in sandy, oil-bearing formations are frequently difficult to operate because the sand in the formation is poorly consolidated and tends to flow into the well with the oil. This "sand production" is a serious problem because the sand causes erosion and premature wearing out of the pumping equipment, and is a nuisance to remove from the oil at a later point in the production operation.

In some wells, particularly in the Saskatchewan area of Canada, oil with sand suspended therein must be pumped into large tanks for storage so that sand can settle out. Frequently, the oil can then only be removed from the upper half of the tank because the lower half of the tank is full of sand. This, too, must be removed at some time and pumped out. Moreover, fine sand is not always removed by this method and this causes substantial problems later in production operations which can lead to rejection of sand-bearing oil by the pipeline operator.

Also, removal of oil from tar sand formations is particularly challenging because high temperature steam is used. A suitable consolidating agent must withstand a similar harsh environment. In order to prevent caving around a wellbore and damage thereto, during the production of oil from a tar sand formation, it is often necessary to consolidate the formation.

Steam or fire stimulation recovery techniques are used to increase production from viscous oil-bearing formations. In steam stimulation techniques, steam is used to heat a section of the formation adjacent to a wellbore so that production rates are increased through lowered oil viscosities.

In a typical conventional steam stimulation injection cycle, steam is injected into a desired section of a reservoir or formation. A shut-in or soak phase may follow, in which thermal energy diffuses through the formation. A production phase follows in which oil is produced until oil production rates decrease to an uneconomical amount. Subsequently, injection cycles are often used to increase recovery. During the production phase, sand flowing from a subsurface formation may leave therein a cavity which may result in caving of the formation and collapse of the casing.

Therefore, what is needed is a method to consolidate a formation so as to prevent caving of an interval near the wellbore which interval requires stability to withstand low pH steam during a steam stimulation or thermal oil recovery process.

SUMMARY OF THE INVENTION

This invention is directed to a method for consolidating sand in an unconsolidated or loosely consolidated oil or hydrocarbonaceous fluid containing formation or reservoir. In the practice of this invention, an aqueous hydroxide solution is injected into an interval of the formation where sand consolidation is desired. The hydroxide which is used is a member selected from the group consisting of an alkali metal hydroxide, organoammonium hydroxide, or ammonium hydroxide. The aqueous hydroxide solution enters the interval through perforations made in a cased well penetrating the formation. By use of a mechanical packer, or other means, e.g. size selective gel, penetration of the fluid into the interval can be controlled. As the aqueous hydroxide solution enters the interval, it saturates said interval.

Once the interval is saturated with the hydroxide solution, a spacer volume of a water-immiscible hydrocarbonaceous liquid is directed into the interval requiring sand consolidation. Hydrocarbonaceous liquids for use herein comprise paraffinic and aromatic liquids. Paraffinic liquids are preferred. Preferred paraffinic liquids are selected from a member of the group consisting of mineral oils, naphthas, $C_5-C_{40}$ alkanes, and mixtures thereof.

After a desired spacer volume of hydrocarbonaceous liquid has been placed into the interval requiring sand consolidation, a water-miscible organic solvent containing an alkylpolysilicate is next injected into the interval. Upon coming into contact with the aqueous hydroxide solution which remains on the sand grains and between the sand grain contact points, alkylpolysilicate reacts with the aqueous hydroxide solution to form silica cement in-situ. The silica cement which is formed is stable at pH's equal to or less than about 7, and temperatures up to and in excess of about 400° F. These steps can be repeated until fines migration is controlled. Thereafter, production is commenced and substantially fines free hydrocarbonaceous fluids are produced to the surface.

By controlling the strength and rate of injection of the aqueous hydroxide and solvent containing the alkylpolysilicate which are injected into the interval being treated, the permeability, porosity and consolidation strength of the formation can be tailored as desired. Once the treated interval has been consolidated to a desired strength, an enhanced oil recovery (EOR) method can be used to produce hydrocarbonaceous fluids to the surface. EOR methods which can be utilized include carbon dioxide stimulation, water-flooding, steam-flooding, or fire-flooding.

It is therefore an object of this invention to provide for an in-situ silica cement composition for consolidating an interval of a formation which composition is more natural to a formation's environment.

It is another object of this invention to provide for a composition which will ensure an even flow front and a homogeneous consolidation of an interval of a formation requiring treatment.

It is yet another object of this invention to consolidate an unconsolidated or loosely consolidated interval in a formation to prevent caving and damage to an adjacent wellbore.

It is a still yet further object of this invention to provide for a method to obtain a desired consolidation within an interval of a formation which can be reversed by treating the interval with a strong base.

It is an even still yet further object of this invention to provide for a formation consolidation agent which is resistant to high temperatures and low pH's.

It is yet an even still further object of this invention to provide for a consolidation composition lacking a particulate matter therein which matter might prevent penetration of the composition in an area requiring consolidation, flow alteration, or pore size reduction.

BRIEF DESCRIPTION OF THE DRAWING

The drawing is a schematic representation showing how the composition is injected into the formation so as to consolidate sand grains while maintaining the permeability of the formation.

DESCRIPTION OF THE PREFERRED EMBODIMENT

In the practice of this invention, as shown in the drawing, an aqueous hydroxide slug is injected into well 10 where it enters formation 12 via perforations 14. As the aqueous hydroxide slug proceeds through formation 12, it saturates sand grains in the near-wellbore area of the formation. After saturating the near-wellbore area with the aqueous hydroxide solution selected from a member of the group consisting of an organoammonium hydroxide, ammonium hydroxide or alkali metal hydroxide, a spacer volume of a water-immiscible hydrocarbonaceous liquid 16 is next injected into the near-wellbore area. Hydrocarbonaceous liquids for use herein comprise paraffinic and aromatic liquids. Paraffinic liquids are preferred.

This spacer volume of water-immiscible hydrocarbonaceous liquid is selected from a member of the group consisting of mineral oils, naphthas, $C_5$-$C_{40}$ alkanes, and mixtures thereof. The water-immiscible hydrocarbonaceous fluid used as a spacer volume may be of an industrial grade. Utilization of the spacer volume should be kept to a minimum in order to keep as much of the organoammonium hydroxide, alkali metal or ammonium hydroxide as possible in spaces between the sand grains in the formation. By keeping the maximum amount of said hydroxide between sand grains, a stronger and more consolidated silica cement will be formed. A spacer volume of the hydrocarbonaceous liquid is used to remove excess hydroxide from between the sand grains while allowing a thin hydroxide film to remain on the surface to obtain a subsequent cementing reaction with an injected alkylpolysilicate solution.

Afterwards, a slug containing a water-miscible organic solvent with an alkylpolysilicate 18 mixed therein is injected into the formation whereupon it displaces any spacer volume of hydrocarbonaceous liquid remaining therein. The water-miscible organic solvent is selected from a member of the group consisting of methanol, ethanol, higher alcohols, glycols, ketones, tetrahydrofuran, and dimethyl sulfoxide. This organic solvent can be of an industrial grade. As the aqueous hydroxide solution and the alkylpolysilicate meet, they react simultaneously to form a silica cement between the sand grains. The cementing reaction takes place so as to bind sand grains in the formation thereby forming a consolidated porous zone 22. Although the sand grains are consolidated, a porous cement is formed which results in a substantially high retention of the formation's permeability. Retention of the formation's permeability allows alkylpolysilicate slug 18 to move continually through the formation while cement is being formed between sand grains.

Injection of the alkali metal hydroxide slug, spacer volume 16 and alkylpolysilicate slug 18 containing alkylpolysilicate can be continued until enough cement has been formed to consolidate sand grains in the formation. As will be understood by those skilled in the art, this amount of cement is formation dependent and may vary from formation to formation. Core samples obtained from the interval to be treated can be tested to determine the required amount of cement. U.S. Pat. No. 4,549,608 which issued to Stowe et al. teaches a method of sand control where clay particles are stabilized along the face of a fracture. This patent is incorporated by reference herein.

In order to increase the cement's consolidation strength, the concentration of the organoammonium hydroxide, alkali metal hydroxide or ammonium hydroxide contained in an aqueous solution slug or the alkylpolysilicate contained in the solvent slug can be increased. Similarly, the flow rates of each of these slugs through the formation can be decreased to obtain better consolidation strength. A decreased flow rate is particularly beneficial for increasing the consolidation strength when the alkylpolysilicate slug's flow rate is decreased. As will be understood by those skilled in the art, optimal concentrations and flow rates are formation dependent. Therefore, optimal concentrations and flow rates should be geared to field conditions and requirements.

Organoammonium hydroxides which can be used in an aqueous solution include those having $C_1$ through $C_{10}$ alkyl or aryl groups, including those with other hetero atoms. Tetramethylammonium hydroxide is preferred.

The alkali metal hydroxide which is utilized herein comprises sodium, potassium, or lithium. Sodium and potassium are the preferred alkali metal hydroxides for use herein. Sodium hydroxide is most preferred. The concentration of the alkali metal hydroxide solution, organoammonium hydroxide, or ammonium hydroxide is about 20 to about 60 wt. percent, preferably about 30 wt. percent. As will be understood by those skilled in the art, the exact concentration should be determined for each application. In general, concentrated hydroxide solutions result in greater permeability reduction due to higher contents of solids which form in the consolidated interval.

Alkylpolysilicate (EPS) contained in the organic solvent is the hydrolysis-condensation product of alkylorthosilicate according to the reaction equation below:

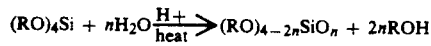

where $n \leq 2$
$R = C_1$-$C_{10}$
R should be $\leq 10$ carbons for good solubility and high $SiO_2$ content.

Tetramethyl (TMS) or tetraethylorthosilicates (TEOS) are preferred. Mixed alkylorthosilicate can also be used. It is desirable to obtain an alkylpolysilicate with $n > 0.5$, preferably n greater than 1. As n increases, the $SiO_2$ content increases, resulting in stronger consolidation. It is desirable to use an alkylpolysilicate with a silica content of 30% or more, preferably about 50 wt. %. EPS which is used herein is placed into one of the water-miscible organic solvents mentioned above. The preferred solvent is ethanol. Of course, other alcohols can be used. EPS, TMS, TEOS, or other alkylpolysilicates are contained in the solvent in an amount of from about 10 to about 100 weight percent sufficient to react with the hydroxide contained in the aqueous solution. Twenty (20) to about eighty (80) wt. percent is preferred. Although alcohol is the solvent preferred because of its versatility and availability, other water-miscible organic solvents can be utilized. These solvents, as previously mentioned, include methanol and higher alcohols, glycols, ketones, tetrahydrofuran, and dimethyl sulfoxide.

The viscosity of the silicate in the solvent can also determine the extent to which it will enter an interval of the formation requiring consolidation. In those cases where it is not possible to control the viscosity of the silicate contained in the solvent and preclude entry into a lower permeability zone, a mechanical packer may be used. The silica cement which is formed can withstand pH's less than about 7 and temperatures up to and in excess of about 400° F.

Once the formation's interval has been consolidated as desired, hydrocarbonaceous fluids can be produced from formation 12 into well 10. Alternatively, an enhanced oil recovery (EOR) process can be instituted in formation 12 via well 10. EOR processes which can be utilized include steam-flooding, water-flooding, carbon dioxide stimulation and fire-flooding.

Steam-flooding processes which can be utilized when employing this silica cement consolidation method described herein are detailed in U.S. Pat. Nos. 4,489,783 and 3,918,521 which issued to Shu and Snavely, respectively. U.S. Pat. No. 4,479,894 that issued to Chen et al. describes a water-flooding process which may be used herein. Fire-flooding processes which can be utilized herein are disclosed in U.S. Pat. Nos. 4,440,227 and 4,669,542 which issued to Holmes and Venkatesan, respectively. These patents are hereby incorporated by reference herein.

A carbon dioxide EOR process which can be used after consolidating the formation is disclosed in U.S. Pat. No. 4,513,821 which issued to W. R. Shu on Apr. 30, 1985. This patent is hereby incorporated by reference Although the present invention has been described with preferred embodiments, it is to be understood that variations and modifications may be resorted to without departing from the spirit and scope of this invention, as those skilled in the art readily understand. Such variations and modifications are considered to be within the purview and scope of the appended claims.

What is claimed:

1. A sand consolidating method for an unconsolidated or loosely consolidated formation comprising:
   a) perforating a cased borehole at an interval expected to produce fines or sand when producing hydrocarbonaceous fluids from said interval;
   b) injecting an aqueous solution of an alkali metal hydroxide, ammonium hydroxide, or organoammonium hydroxide into said interval through perforations contained in the borehole which solution is of a strength sufficient to react with a water-miscible organic solvent containing an alkylpolysilicate to form a permeability retentive cement;
   c) injecting thereafter a spacer volume of a water-immiscible hydrocarbonaceous liquid into said interval; and
   d) injecting thereafter into said interval via the perforations a water-miscible organic solvent containing an alkylpolysilicate in an amount sufficient to react with the aqueous hydroxide solution in step b) so as to form a permeability retentive silica cement which binds the sand sufficiently to consolidate the formation and prevent sand from being produced during the production of hydrocarbonaceous fluids.

2. The method as recited in claim 1 where the alkali metal hydroxide comprises ions of sodium, potassium, or lithium, and mixtures thereof.

3. The method as recited in claim 1 where said alkylpolysilicate comprises tetramethyl or tetraethylorthosilicates or mixtures thereof.

4. The method as recited in claim 1 where in step d) the solvent is a member selected from the group consisting of water-miscible alcohols, glycols, ketones, tetrahydrofuran, and dimethyl sulfoxide.

5. The method as recited in claim 1 where in step b) said hydroxide is contained in the aqueous solution in an amount of from about 20 to about 60 weight percent.

6. The method as recited in claim 1 where alkylpolysilicate is contained in said solvent in an amount of about 10 to about 90 weight percent.

7. The method as recited in claim I where steps b), c) and d) are repeated until the formation has been consolidated as desired.

8. The method as recited in claim 1 where said silica cement is resistant to temperatures in excess of about 400° F.

9. The method as recited in claim 1 where the silica cement is resistant to pH's of 7 or less.

10. The method as recited in claim 1 where in step d) said alkylpolysilicate is the hydrolysis condensation product of alkylorthosilicate according to the equation:

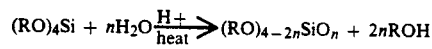

where $n \leq 2$ and $R = C_1-C_{10}$

11. The method as recited in claim 1 where in step c) the spacer volume of liquid is a member selected from the group consisting of mineral oils, naphthas, $C_5-C_{40}$ alkanes, and mixtures thereof.

12. A composition for consolidating an interval of an unconsolidated or loosely consolidated formation comprising:
   a) an aqueous hydroxide solution where the Hydroxide is a member selected from the group consisting of an alkali metal hydroxide, ammonium hydroxide, or organoammonium hydroxide;
   b) a spacer volume of a water-immiscible hydrocarbonaceous liquid; and
   c) a water-miscible organic solvent containing an alkylpolysilicate in an amount sufficient to react with said aqueous hydroxide solution so as to form a permeability retentive silica cement within said interval which cement is of a strength sufficient to bind sand containing particles within the interval which precludes formation sand from being produced from said interval, thereby preventing caving.

13. The composition as recited in claim 12 where the aqueous hydroxide solution comprises ions of sodium, potassium, or lithium, and mixtures thereof.

14. The composition as recited in claim 12 where said alkylpolysilicate comprises tetramethyl or tetraethylorthosilicates and mixtures thereof.

15. The composition as recited in claim 12 wherein in element c) the solvent is a member selected from the group consisting of water-miscible alcohols, glycols, ketones, tetrahydrofuran, and dimethyl sulfoxide.

16. The composition as recited in claim 12 wherein in element a) the hydroxide is contained in the aqueous solution in an amount of from about 20 to about 60 weight percent.

17. The composition as recited in claim 12 where alkylpolysilicate is contained in said solvent in an amount of about 10 to about 90 weight percent.

18. The composition as recited in claim 12 where said silica cement is resistant to temperatures in excess of about 400° F.

19. The composition as recited in claim 12 where the silica cement is resistant to pH's of 7 or lower.

20. The composition as recited in claim 12 where in element c) said alkylpolysilicate is the hydrolysis condensation product of alkylorthosilicate according to the equation:

where $n \leq 2$ and $R = C_1 - C_{10}$.

21. The composition as recited in claim 12 where in element b) the spacer volume of fluid is a member selected from the group consisting of mineral oils, naphthas, $C_5 - C_{40}$ alkanes, and mixtures thereof.

* * * * *